United States Patent
Tann et al.

(10) Patent No.: US 9,743,036 B2
(45) Date of Patent: Aug. 22, 2017

(54) ELECTRONIC DISPLAY ADAPTIVE REFRESH RATE SYSTEMS AND METHODS

(71) Applicant: APPLE INC., Cupertino, CA (US)

(72) Inventors: Christopher P. Tann, San Jose, CA (US); Chaohao Wang, Sunnyvale, CA (US); David S. Zalatimo, San Jose, CA (US); Marc Albrecht, San Francisco, CA (US); Paolo Sacchetto, Cupertino, CA (US); Sandro H. Pintz, Menlo Park, CA (US); Satish S. Iyengar, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 171 days.

(21) Appl. No.: 14/659,723

(22) Filed: Mar. 17, 2015

(65) Prior Publication Data
US 2016/0277706 A1  Sep. 22, 2016

(51) Int. Cl.
*H04N 7/01* (2006.01)
*G09G 5/00* (2006.01)
*G06F 1/32* (2006.01)

(52) U.S. Cl.
CPC ......... *H04N 7/0127* (2013.01); *G06F 1/3265* (2013.01); *G09G 5/001* (2013.01); *H04N 7/0115* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 6,469,744 B1 | 10/2002 | Pearstein | |
| 8,401,081 B2 | 3/2013 | Doser | |
| 9,491,398 B1* | 11/2016 | Hou | H04N 7/013 |
| 2002/0075401 A1 | 6/2002 | Shimizu | |
| 2007/0035660 A1 | 2/2007 | Gong | |
| 2008/0024467 A1* | 1/2008 | Collins | G09G 3/2096 345/204 |
| 2013/0141642 A1 | 6/2013 | Wu et al. | |
| 2014/0368519 A1* | 12/2014 | Wood | G09G 5/391 345/545 |
| 2015/0348509 A1* | 12/2015 | Verbeure | H04N 9/3188 345/213 |
| 2016/0196801 A1* | 7/2016 | Glen | G09G 5/18 345/213 |

* cited by examiner

*Primary Examiner* — Maurice L McDowell, Jr.
(74) *Attorney, Agent, or Firm* — Fletcher Yoder PC

(57) ABSTRACT

Systems and methods for controlling operation of an electronic display are provided. One embodiment describes an electronic display, which includes a display driver that writes image frames to pixels of the electronic display with a first refresh rate or a second refresh rate; and a timing controller that receives a plurality of image frames from an image source, in which the plurality of image frames are displayed on the electronic display to play video content; detects a cadence with which the plurality of image frames are received from the image source; and, based at least in part on the cadence of the plurality of image frames, instructs the display driver to write each of the plurality of image frames either as a single image frame at the first refresh rate or an image frame at the first refresh rate followed by a repeat of the image frame at the second refresh rate.

28 Claims, 6 Drawing Sheets

ELECTRONIC DISPLAY ADAPTIVE REFRESH RATE SYSTEMS AND METHODS

BACKGROUND

The present disclosure relates generally to electronic displays and, more particularly, to display of video content on electronic displays.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, an electronic display may enable a user to perceive visual representations of information by successively displaying image frames on a display panel. For example, image frames may be successively displayed to enable a user to perceive video content. In some embodiments, video content may be captured by an image sensor, for example, in a video camera. More specifically, the image sensor may generate video content data by periodically capturing digital representations of the video content as image frames, for example at 24 Hz. An image source may then process the video content data to generate display image data. The electronic display may then successively display image frames based at least in part on the display image data.

Some electronic displays may have a fixed refresh rate, such as 60 Hz. Accordingly, the image source may generate display image data to enable compatibility with a variety of electronic displays, including fixed refresh rate displays. More specifically, the image source may generate the display image data such that it includes image frames that can be displayed at a desired refresh rate equal to the fixed refresh rate (e.g., 60 Hz). For example, the image source may use telecine pulldown techniques to convert video content data into image frames that can be displayed at the desired refresh rate.

To help illustrate, when the capture rate is 24 Hz and the fixed refresh rate is 60 Hz, the image source may utilize telecine 3:2 pulldown to generate display image data with image frames that can be displayed at 60 Hz. For example, when the video content data includes a first and a second image frame captured at 24 Hz, the image source may generate display image data that enables an electronic display with a fixed 60 Hz refresh rate to display the first image frame three times at 60 Hz followed by the second image frame two times at 60 Hz. However, since writing each image frame to a display panel generally consumes electrical power, the manner with which the image frames are displayed (e.g., refresh rate) may affect electrical power consumption of an electronic display, particularly when the electronic display has a variable refresh rate.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to reducing electrical power consumption of an electronic display while maintaining perceived image quality, particularly when displaying video content. Generally, an image source may communicate display image data to an electronic display, thereby instructing the electronic display to display a visual representation of video content as a plurality of image frames. To facilitate compatibility with electronic displays, including fixed refresh rate electronic displays, the image source may use telecine pulldown techniques to generate display image data that includes image frames that can be displayed at a desired refresh rate equal to the fixed refresh rate.

Generally, an image frame may be written by applying electrical power to pixels in the electronic display. As such, the refresh rate used to display image frames may be affect power consumption by the electronic display. For example, power consumption used to display one 30 Hz image frame may be 40% less than power consumption used to display two 60 Hz image frames.

Additionally, the refresh rate used to display image frames may also affect perceived image quality. More specifically, perceived image quality may be affected by duration an image frame is perceivable to a user. For example, depicting motion with shorter duration image frames (e.g., a higher refresh rate), may enable motion blur to be reduced because more image frames can be used to depict the motion.

Accordingly, the techniques described herein may control operation of an electronic display to reduce power consumption while maintaining perceived image quality. In some embodiments, the electronic display may support multiple discrete refresh rates (e.g., variable refresh rate). For example, the electronic display may display image frames at either 30 Hz or 60 Hz. As such, the electronic display may control operation by determining what refresh rates to use for displaying video content.

More specifically, the refresh rates may be determined based at least in part on the capture rate of the video content, which may be determined based at least in part on the cadence with which display image data is received from the image source. For example, the electronic display may determine that the capture rate of video content is 24 Hz when the image data has a 3:2 cadence or a 2:3 cadence. In some embodiments, the electronic display may determine that the display image data has a 3:2 cadence when the display image data instructs the electronic display to display a first image frame for a duration equivalent to three 60 Hz image frames and a second image frame for a duration equivalent to two 60 Hz image frames.

Based on the capture rate and/or the display image data cadence, the electronic display may use one or more of the discrete refresh rates to display image frames. For example, when a 3:2 cadence is detected, the electronic display may display a first image frame at 30 Hz followed by a repeat of the first image frame at 60 Hz, a second image frame at 30 Hz, a third image frame at 30 Hz followed by a repeat of the third image frame at 60 Hz, a fourth image frame at 30 Hz, and so on. In this manner, the techniques described herein may reduce of power consumption while maintaining perceive image quality by utilizing lower refresh rates (e.g., 30 Hz) without affecting duration each image frame is perceivable.

BRIEF DESCRIPTION OF THE DRAWINGS

Various aspects of this disclosure may be better understood upon reading the following detailed description and upon reference to the drawings in which.

DETAILED DESCRIPTION

Figure 1:
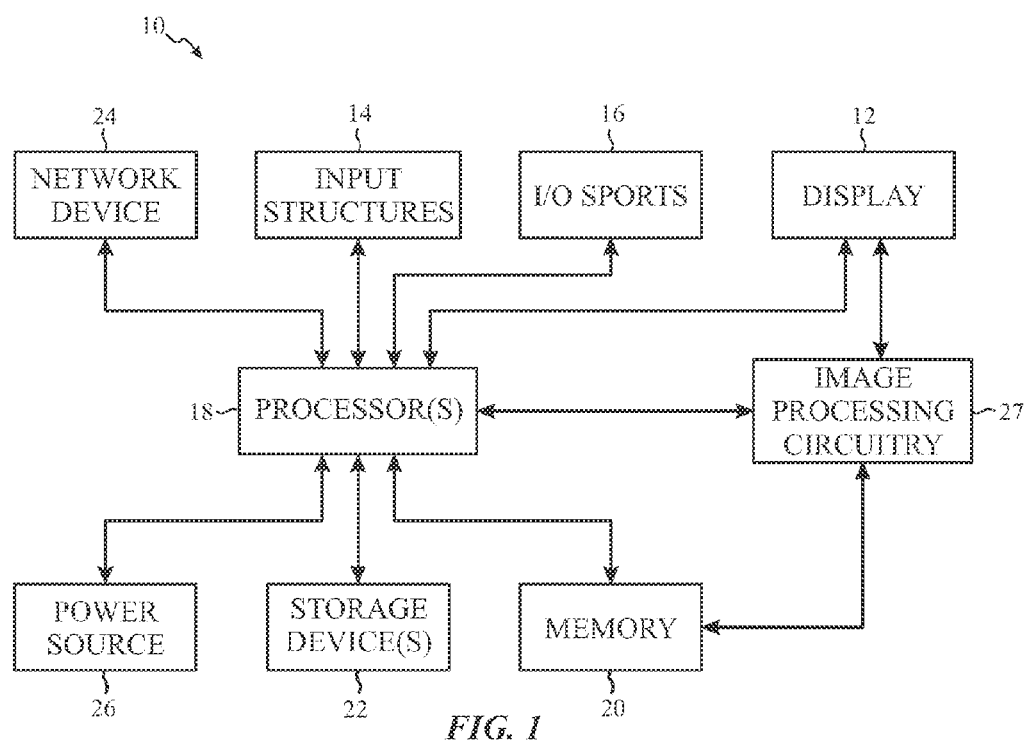
FIG. 1 is a block diagram of a computing device used to display image frames, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electronic display may enable a user to perceive a visual representation of video content by successively displaying image frames based on video content data captured by an image sensor. In some embodiments, the image sensor may generate video content data by successively capturing digital representations of the video content as image frames. As used herein, the rate at which the image sensor captures the image frames is referred to as the "capture rate." In some embodiments, the capture rate of the video content data may be 24 Hz.

An image source (e.g., a graphics processing unit) may then process/analyze the video content data to generate display image data, which may instruct the electronic display to display image frames. More specifically, the display image data may include image frames and a desired refresh rate with which to display the image frames. As used herein, the "refresh rate" is intended to describe the rate at which an electronic display displays image frames.

In some embodiments, the image source may be compatible with a variety of electronic displays, which may include electronic displays with a fixed refresh rate (e.g., 60 Hz). Accordingly, to accommodate a variety of electronic displays, the image source may generate display image data that enables an electronic display to display image frames at a desired refresh rate equal to the fixed refresh rate. However, since the capture rate of the video content data may be different from the desired refresh rate, the image source may convert image frames captured at the capture rate into image frames that may be displayed at the desired refresh rate.

To help illustrate, the image source may use telecine 3:2 pulldown to convert video content data captured at 24 Hz into display image data that may be displayed at 60 Hz. For example, when the video content data includes a first and a second image frame captured at 24 Hz, the display image data may instruct an electronic display to display the first image frame for a duration equivalent to three 60 Hz image frames followed by the second image frame for a duration equivalent to two 60 Hz image frames. Accordingly, a fixed refresh rate electronic display may display the first image frame three times at 60 Hz followed by the second image frame two times at 60 Hz.

Generally, an image frame is generally written by applying voltage to pixels in the electronic display and, thus, consumes electrical power. As such, the frequency that image frames are written (e.g., refresh rate) may impact power consumption of the electronic display. More specifically, a higher refresh rate may increase power consumption while a lower refresh rate may reduce power consumption. For example, a user may perceive an image for 33.3 milliseconds either when the electronic display displays two 60 Hz image frames or when the electronic display displays a single 30 Hz image frame. However, power consumption used to display the 30 Hz image frame may be 40% less than power consumption used to display the two 60 Hz image frames.

Additionally, each displayed image frame is generally static. In other words, the electronic display may depict motion by rapidly displaying image frames, which each depicts a still image of an instant of the motion. As such, a user's perception of the motion may be affected by duration each image frame is perceivable. For example, increasing the refresh rate (e.g., shortening perceived duration), may enable an increase in the number of instants of the motion displayed, thereby reducing motion blur. On the other hand, reducing the refresh rate (e.g., increasing perceived duration), may result in a decrease in the number of instants of the motion displayed, thereby increasing motion blur. In other words, refresh rate used by an electronic display may impact both power consumption as well as perceived image quality.

Accordingly, techniques described herein may improve the display of video content on an electronic display by reducing power consumption while maintaining image quality. As will be described in more detail below, the electronic display generally receives a digital representation of the video content from an image source as display image data. Additionally, in some embodiments, the electronic display may support multiple discrete refresh rates. For example, the electronic display may support a 30 Hz refresh rate and a 60 Hz refresh rate. As such, the electronic display may display the video content by determining what refresh rate to use for displaying image frames of the display image data. In some embodiments, the electronic display may determine what refresh rates to use based at least in part on the capture rate of the video content and/or cadence of the display image data. For example, when the capture rate is 24 Hz and/or the image data has a 3:2 cadence, the electronic display may display a first image frame at 30 Hz followed by a repeat of the first image frame at 60 Hz, a second image frame at 30 Hz, a third image frame at 30 Hz followed by a repeat of the third image at 60 Hz, a fourth image at 30 Hz, and so on.

In this manner, the power consumption of the electronic display may be reduced because a lower refresh rate may be used to display image frames. For example, instead of displaying the first image frame as three 60 Hz image frames, the electronic display may display the first image frame as a 30 Hz image frame followed by a 60 Hz image frame. Additionally, instead of display the second image frame as two 60 Hz image frames, the electronic display may display the second image frame as a 30 Hz image frame. In fact, in such an embodiment, the power consumption may be reduced by 32% compared to displaying five 60 Hz frames.

Moreover, the perceived image quality of the electronic display may be maintained even though a lower refresh rate may be used because each image frame may be perceived by a user for approximately the same duration. For example, the first image frame may generally be displayed for approximately 50 milliseconds either by displaying the first image frame as three 60 Hz image frames or by displaying the first image frame as a 30 Hz image frame followed by a 60 Hz image frame. Additionally, the second image frame may generally be displayed for approximately 33.3 milliseconds either by displaying the second image frame as two 60 Hz image frames or by displaying the second image frame as a 30 Hz image frame. In this manner, the reduced refresh rate may be implemented without affecting perceivable duration of each image frame.

As such, the techniques described herein may enable an electronic display to reduce power consumption while maintaining image quality. To help illustrate, a computing device 10 that may utilize an electronic display 12 to display image frames is described in FIG. 1. As will be described in more detail below, the computing device 10 may be any suitable computing device, such as a handheld computing device, a tablet computing device, a notebook computer, and the like.

Accordingly, as depicted, the computing device 10 includes the electronic display 12, input structures 14, input/output (I/O) ports 16, one or more processor(s) 18, memory 20, non-volatile storage device 22, a network interface 24, a power source 26, and image processing circuitry 27. The various components described in FIG. 1 may include hardware elements (including circuitry), software elements (including computer code stored on a non-transitory computer-readable medium), or a combination of both hardware and software elements. It should be noted that FIG. 1 is merely one example of a particular implementation and is intended to illustrate the types of components that may be present in the computing device 10. Additionally, it should be noted that the various depicted components may be combined into fewer components or separated into additional components. For example, the image processing circuitry 27 (e.g., a graphics processing unit) may be included in the one or more processors 18.

As depicted, the processor 18 and/or image processing circuitry 27 are operably coupled with memory 20 and/or non-volatile storage device 22. More specifically, the processor 18 and/or image processing circuitry 27 may execute instruction stored in memory 20 and/or non-volatile storage device 22 to perform operations in the computing device 10, such as generating and/or transmitting the display image data. As such, the processor 18 and/or image processing circuitry 27 may include one or more general purpose microprocessors, one or more application specific processors (ASICs), one or more field programmable logic arrays (FPGAs), or any combination thereof. Additionally, memory 20 and/or non-volatile storage device 22 may be a tangible, non-transitory, computer-readable medium that stores instructions executable by and data to be processed by the processor 18 and/or image processing circuitry 27. In other words, the memory 20 may include random access memory (RAM) and the non-volatile storage device 22 may include read only memory (ROM), rewritable flash memory, hard drives, optical discs, and the like. By way of example, a computer program product containing the instructions may include an operating system or an application program.

Additionally, as depicted, the processor 18 is operably coupled with the network interface 24 to communicatively couple the computing device 10 to a network. For example, the network interface 24 may connect the computing device 10 to a personal area network (PAN), such as a Bluetooth network, a local area network (LAN), such as an 802.11x Wi-Fi network, and/or a wide area network (WAN), such as a 4G or LTE cellular network. Furthermore, as depicted, the processor 18 is operably coupled to the power source 26, which provides power to the various components in the computing device 10. As such, the power source 26 may include any suitable source of energy, such as a rechargeable lithium polymer (Li-poly) battery and/or an alternating current (AC) power converter.

As depicted, the processor 18 is also operably coupled with I/O ports 16, which may enable the computing device 10 to interface with various other electronic devices, and input structures 14, which may enable a user to interact with the computing device 10. Accordingly, the inputs structures 14 may include buttons, keyboards, mice, trackpads, and the like. Additionally, in some embodiments, the electronic display 12 may include touch sensitive components.

In addition to enabling user inputs, the electronic display 12 may display image frames, such as a graphical user interface (GUI) for an operating system, an application interface, a still image, or video content. As depicted, the display is operably coupled to the processor 18 and the image processing circuitry 27. Accordingly, the image frames displayed by the electronic display 12 may be based on display image data received from the processor 18 and/or the image processing circuitry 27.

As will be described in more detail below, the electronic display 12 may display image frames based at least in part on the capture rate of video content. More specifically, the electronic display 12 may determine the capture rate of displayed video content based at least in part on cadence of display image data received from the processor 18 and/or the image processing circuitry 27. For example, electronic display 12 may determine that the capture rate is 24 Hz when the received display image data has a 2:3 cadence or a 3:2 cadence. Based on the capture rate, the electronic display 12 may determine refresh rate with which to display image frames such that a lower refresh rate may be used, thereby reducing power consumption, while maintaining image quality.

Figure 2:
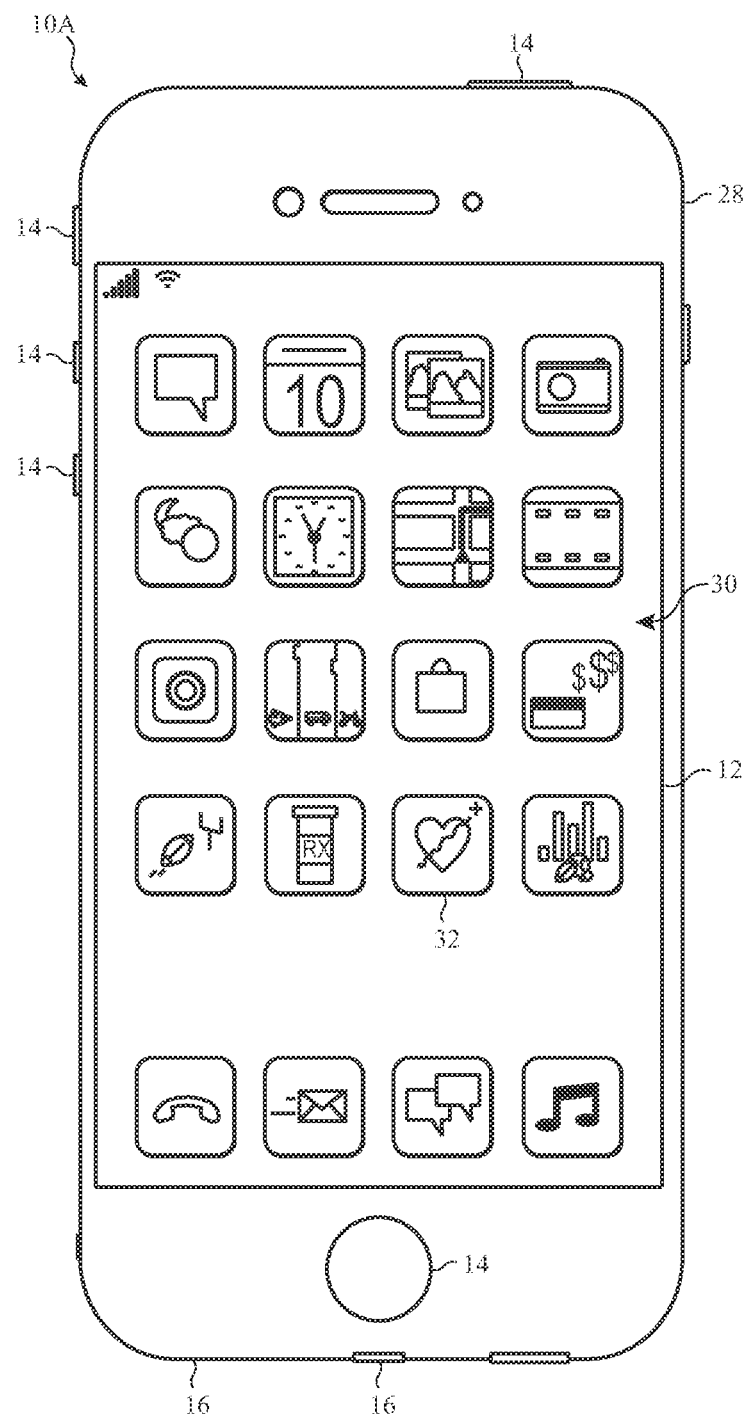
FIG. 2 is an example of the computing device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an enclosure 28, which may protect interior components from physical damage and to shield them from electromagnetic interference. The enclosure 28 may surround the electronic display 12, which, in the depicted embodiment, displays a graphical user interface (GUI) 30 having an array of icons 32. By way of example, when an icon 32 is selected either by an input structure 14 or a touch sensing component of the electronic display 12, an application program may launch.

Additionally, as depicted, input structure 14 may open through the enclosure 28. As described above, the input structures 14 may enable a user to interact with the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Furthermore, as depicted, the I/O ports 16 open through the enclosure 28. In some embodiments, the I/O ports 16 may include, for example, an audio jack to connect to external devices.

Figure 3:
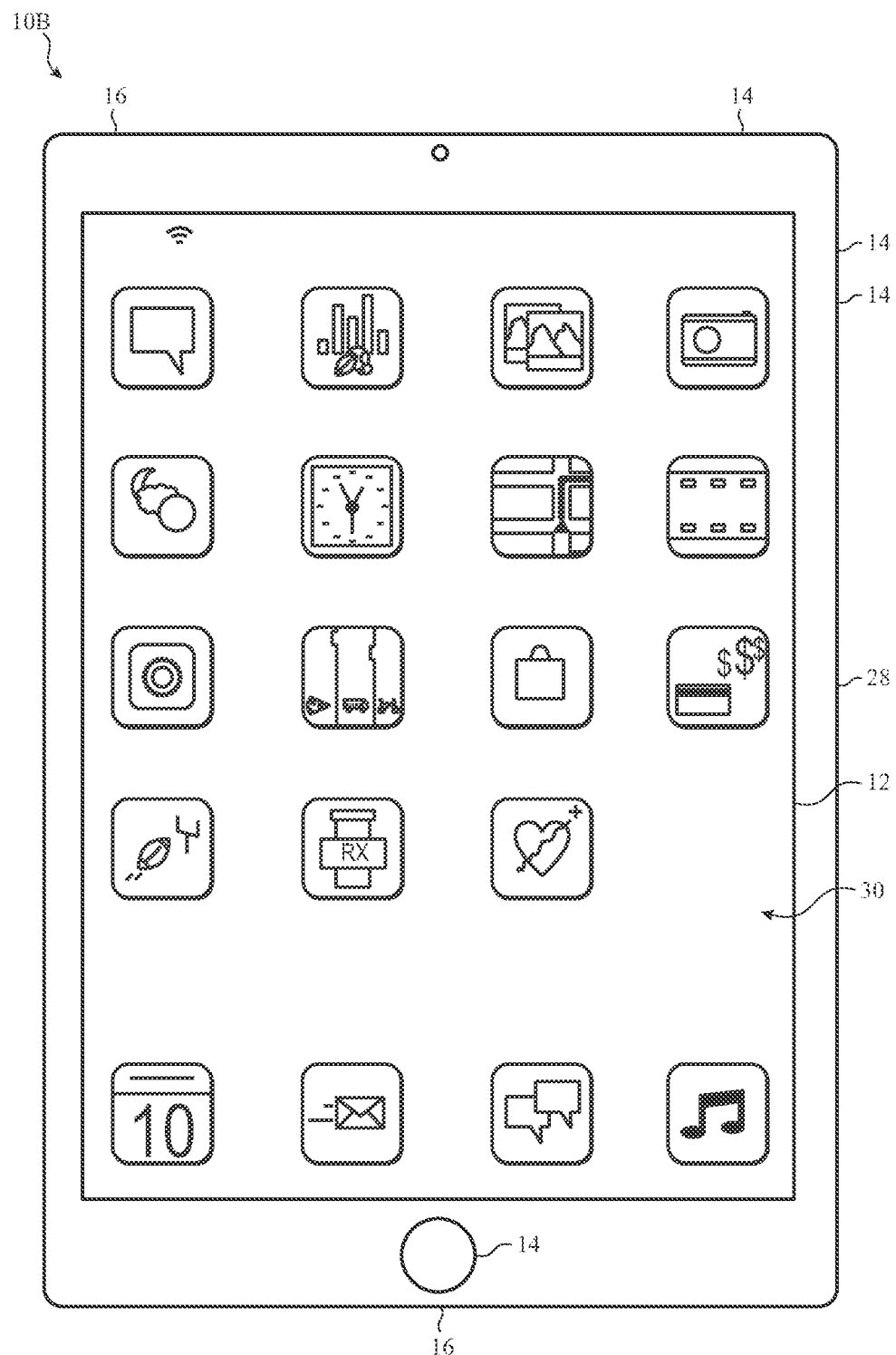
FIG. 3 is an example of the computing device of FIG. 1, in accordance with an embodiment.
Figure 4:
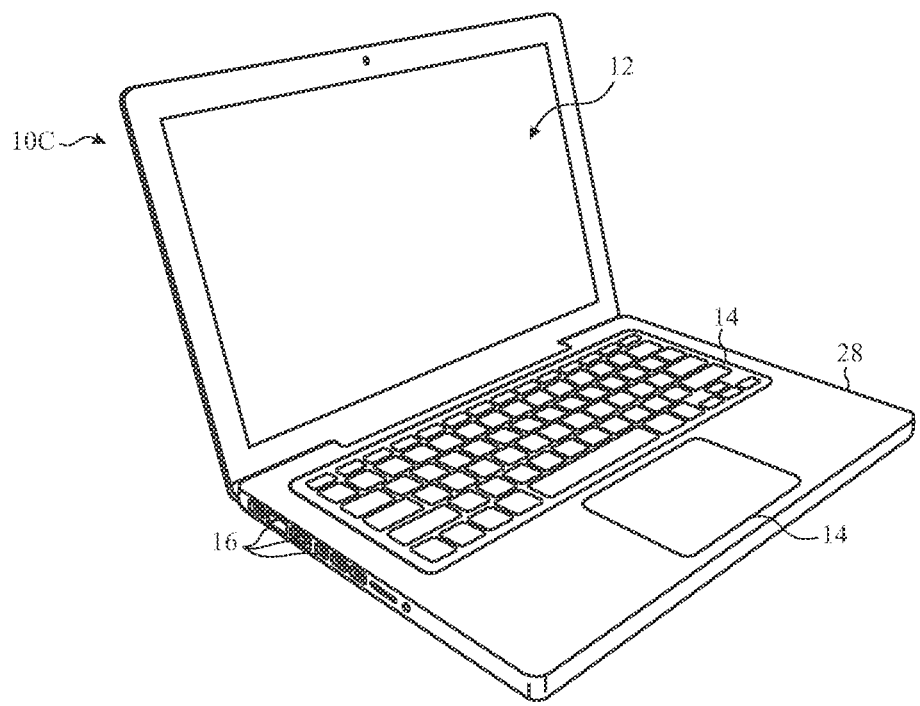
FIG. 4 is an example of the computing device of FIG. 1, in accordance with an embodiment.

To further illustrate a suitable computing device 10, a tablet device 10B is described in FIG. 3, such as any iPad® model available from Apple Inc. Additionally, in other embodiments, the computing device 10 may take the form of a computer 10C as described in FIG. 4, such as any Macbook® or iMac® model available from Apple Inc. As depicted, the computer 10C also includes a display 12, input structures 14, I/O ports 16, and a enclosure 28.

Figure 5:
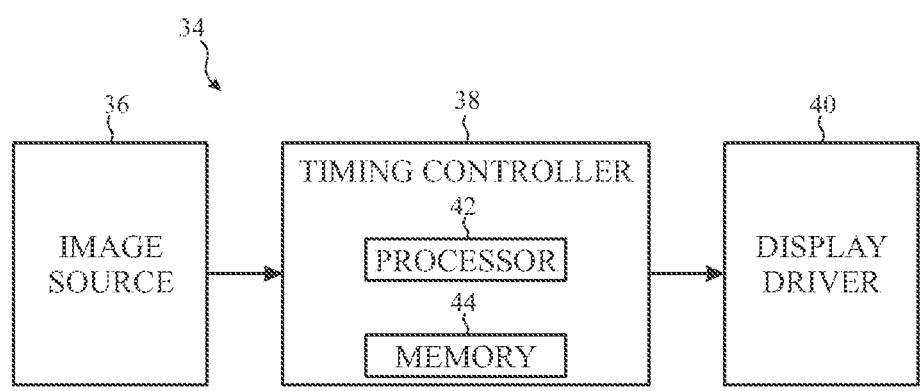
FIG. 5 is block diagram of a portion of the computing device of FIG. 1 used to display image frames, in accordance with an embodiment.

As described above, the electronic display 12 may display image frames based on display image data received from the processor 18 and/or the image processing circuitry 27. More specifically, to enable the display of the image frames, the display image data may be processed by any combination of the processor 18, the image processing circuitry 27, and the electronic display 12 itself. To help illustrate, a portion 34 of the computing device 10 that processes and communicates display image data is described in FIG. 5.

As depicted, the portion 34 of the computing device 10 includes an image source 36, a timing controller (TCON) 38, and a display driver 40. More specifically, the image source 36 may generate display image data and transmit the display image data to the timing controller 38. Accordingly, in some embodiments, the image source 36 may include the processor 18 and/or the image processing circuitry 27. The timing controller 38 may then analyze the received display image data and instruct the display driver 40 to write an image frame to pixels on a display panel by applying a voltage signal. As such, in some embodiments, the timing controller 38 and the display driver 40 may be included in the electronic display 12.

To facilitate processing/analyzing the display image data and performing other operations, the timing controller 38 may include a processor 42 and memory 44. In some embodiments, the timing controller processor 42 may be included in the processor 18 and/or the image processing circuitry 27. In other embodiments, the timing controller processor 42 may be a separate processing module. Additionally, in some embodiments, the timing controller memory 44 may be included in memory 20, non-volatile storage device 22, or another tangible, non-transitory, computer readable medium. In other embodiments, the timing controller memory 44 may be a separate tangible, non-transitory, computer readable medium that stores instructions executable by the timing controller processor 42. Additionally, in some embodiments, the memory 44 may include a buffer to store the display image data for processing.

More specifically, the timing controller 38 may analyze the received display image data to determine the magnitude the voltage signal to apply to each pixel to achieve the desired image frame and instruct the display driver 40 accordingly. Additionally, the timing controller 38 may analyze the received display image data to determine the capture rate of video content. In some embodiments, the timing controller 38 may determine the capture rate of video content based at least in part on cadence of the display image data received from the image source 36. The timing controller 38 may then instruct the display driver 40 to adjust refresh rate of the electronic display 12 used to successively display image frames based on the determined capture rate of the video content.

Figure 6:
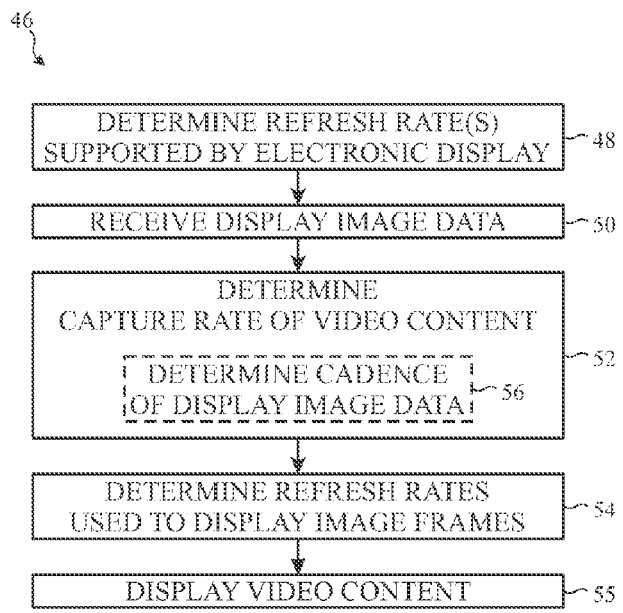
FIG. 6 is a flow diagram of a process for displaying video content on an electronic display, in accordance with an embodiment.

To help illustrate, one embodiment of a process 46 for successively displaying image frames on the electronic display 12 is described in FIG. 6. Generally, the process 46 includes determining refresh rate(s) supported by an electronic display (process block 48), receiving display image data (process block 50), determining capture rate of video content (process block 52), determining refresh rate to use to display image frames (process block 54), and displaying the video content (process block 55). In some embodiments, the process 46 may be implemented using instructions stored in the timing controller memory 44 and/or another suitable tangible non-transitory computer-readable medium and executable by the timing controller processor 42 and/or another suitable processing circuitry.

To simplify the following discussion, the techniques are described in relation to video content with a capture rate of 24 Hz and an electronic display 12 that supports a 30 Hz refresh rate and a 60 Hz refresh rate. Nevertheless, one of ordinary skill in the art will understand that the following discussion is merely illustrative and be able to expand the techniques to other capture rates, other refresh rates, and/or other cadence patterns.

Accordingly, in some embodiments, the timing controller 38 may determine the one or more discrete refresh rates supported by the electronic display 12 (process block 48). In some embodiments, the supported refresh rates may be predetermined by a manufacturer and stored in memory 44. Accordingly, in such embodiments, the timing controller 38 may determine the supported refresh rates by polling memory 44, for example, upon powering on the electronic display 12 or commissioning of the electronic display 12. In some embodiments, the timing controller 38 may determine that the electronic display 12 supports a 30 Hz refresh rate and a 60 Hz refresh rate.

Additionally, the timing controller 38 may receive the display image data from the image source 36, for example, via a data bus in the computing device 10 (process block 50). As described above, the display image data may describe image frames to be displayed on the electronic display 12 and a desired refresh rate with which to display the image frames. More specifically, the timing controller 38 may receive the image frames as a source frame stream and store the image frames in memory (e.g., panel buffer) 44.

The timing controller 38 may then determine the capture rate of video content described by the display image data (process block 52). In some embodiments, the image source 36 may communicate the capture rate of the video content to the timing controller 38. For example, the image source 36 may inform the timing controller 38 that the capture rate of the video content is 24 Hz when sending the display image data.

In other embodiments, the timing controller 38 may determine the capture rate of the video content by determining cadence of the display image data (process block 54). For example, the timing controller 38 may determine that the capture rate is 24 Hz when the display image data has a 3:2 cadence or a 2:3 cadence. Generally, the timing controller 38 may determine the cadence based on duration the display image data instructs the electronic display 12 to display each image frame. For example, when the display image data instructs the electronic display 12 to display a first image frame for a duration one and a half time longer than a second image frame, the timing controller 38 may determine that the cadence is a 3:2 cadence. On the other hand, when the display image data instructs the electronic display 12 to display the second image frame for a duration one and a half times longer than the first image frame, the timing controller 38 may determine that the cadence is a 2:3 cadence.

Figure 7:
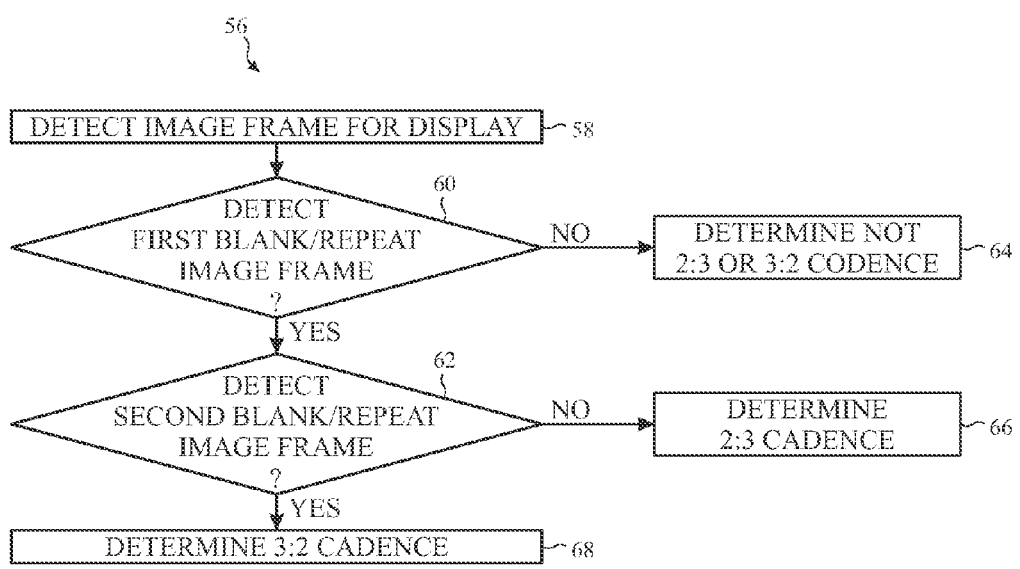
FIG. 7 is a flow diagram of a process for determining cadence of display image data received from an image source, in accordance with an embodiment.

To help illustrate, one embodiment of a process 56 for determining cadence of display image data is described in FIG. 7. Generally, process 56 includes detecting an image frame for display (process block 58), detecting a first blank/repeat image frame (decision block 60), and detecting a second blank/repeat image frame (decision block 62). When the first blank/repeat image frame is not detected, the process 56 includes determining that the cadence is not a 2:3 cadence or a 3:2 cadence (process block 64). When the first blank/repeat frame is detected and the second blank/repeat frame is not detected, the process 56 includes determining that the cadence is a 2:3 cadence (process block 66). Additionally, when the first and the second blank/repeat frame are detected, the process 56 includes determining that the cadence is a 3:2 cadence (process block 68). In some embodiments, the process 56 may be implemented using instructions stored in the timing controller memory 44 and/or another suitable tangible non-transitory computer-readable medium and executable by the timing controller processor 42 and/or another suitable processing circuitry.

Accordingly, the timing controller 38 may detect an image frame for display based on the display image data received from the image source 36 (process block 58). More specifically, the timing controller 38 may detect an image frame for display when the timing controller 38 receives an image frame that varies from an image frame displayed directly prior to the received image frame.

When the image frame for display is detected, the timing controller 38 may determine desired duration to display the image frame. Depending on the implementation, the image source 36 may utilize various techniques to instruct the electronic display 12 regarding desired duration to display the image frame. In some embodiments, the image source 36 may instruct the electronic display 12 to hold a displayed image frame by transmitting a repeated image frame or a blank image frame. As used herein, a "repeated image frame" and a "blank image frame" are intended to describe an image frame that does not instruct the electronic display to refresh.

For example, the image source 36 may instruct the electronic display hold a first image frame for a duration equivalent to two 60 Hz image frames by transmitting the first image frame at 60 Hz followed by a repeat of the first image frame or a blank image frame at 60 Hz. As described herein, the first image frame may be referred to as a "2-repeat frame" because it is held a duration equivalent to two 60 Hz image frames. Additionally, the image source 36 may instruct the electronic display hold a second image frame for a duration equivalent to three 60 Hz by transmitting the second image frame at 60 Hz, followed by a repeat of the second image frame or a blank image frame at 60 Hz, and followed by another repeat of the second image frame or another blank image frame at 60 Hz. As described herein, the second image frame may be referred to as a "3-repeat frame" because it is held a duration equivalent to three 60 Hz image frames.

Accordingly, the timing controller 38 may determine desired duration to display the image frame by detecting whether the image frame for display is followed by a first blank/repeat image frame and a second blank/repeat image frame (decision blocks 60 and 62). Thus, when the timing controller 38 detects that the image frame for display is followed by a first blank/repeat frame but not a second blank/repeat frame, the timing controller 38 may determine that the image frame is a 2-repeat frame. As such, the timing controller 38 may determine that the cadence of the display image data may be a 2:3 cadence (process block 66).

On the other hand, when the timing controller 38 detects that the image frame for display is followed by a first and a second blank/repeat frame, the timing controller 38 may determine that the desired duration to display the image frame is a 3-repeat frame. As such, the timing controller 38 may determine that the cadence of the display image data may be a 3:2 cadence (process block 68).

As can be appreciated, transmitting image frames from the image source 36 to the electronic display 12 may consume power. Accordingly, in some embodiments, the image source 36 may skip transmitting the repeat/blank image frames and instead transmit an idle pattern. For example, the image source 36 may utilize image data that includes the first image frame at 60 Hz, followed by an idle pattern equivalent to two 60 Hz image frames, followed by the second image frame at 60 Hz, and followed by an idle pattern equivalent to a 60 Hz image frame. Thus, instead of detecting the presence of the first and/or second blank/repeat image frames, the timing controller 38 may determine whether duration of an idle pattern between received image frames is equivalent to a single 60 Hz image frame or a two 60 Hz image frames.

As described above, the timing controller 38 may then determine that the capture rate of the video content is 24 Hz when the timing controller 38 detects a 3:2 cadence or a 2:3 cadence. Additionally, based on the video content capture rate and/or cadence of the display image data, the timing controller 38 may determine refresh rates with which to display each image frame (process block 54) and display the video content by displaying the image frames at the determined refresh rates (process block 55).

Figure 8:
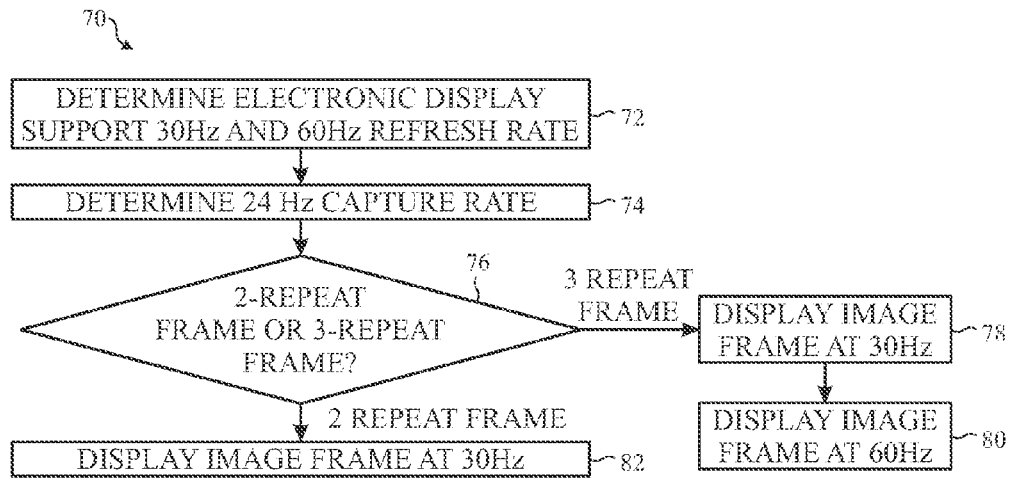
FIG. 8 is a flow diagram of a process for determining refresh rate used to display video content, in accordance with an embodiment.

To help illustrate, one embodiment of a process 70 for determining the refresh rates and displaying the video content is described in FIG. 8. Generally, the process 70 includes determining that an electronic device supports a 30 Hz refresh rate and a 60 Hz refresh rate (process block 72), determining that video content has a 24 Hz capture rate (process block 74), determining whether an image frame is a 2-repeat frame or a 3-repeat frame (decision block 76), displaying the image frame at 30 Hz (process block 78) and at 60 Hz (process block 80) when the image frame is a 3 repeat frame, and displaying the image frame at 30 Hz when the image frame is a 2 repeat frame (process block 82). In some embodiments, the process 70 may be implemented using instructions stored in the timing controller memory 44 and/or another suitable tangible non-transitory computer-readable medium and executable by the timing controller processor 42 and/or another suitable processing circuitry.

Accordingly, in some embodiments, the timing controller 38 may determine that the electronic display 12 supports a 30 Hz refresh rate and a 60 Hz refresh rate (process block 72). As described above, the timing controller 38 may determine the supported refresh rates by polling memory 44. Additionally, the timing controller 38 may determine that the video content has a 24 Hz capture rate when the timing controller 38 detects a 3:2 cadence or a 2:3 cadence (process block 74). As described above, display image data may have a 3:2 cadence or a 2:3 cadence when the display image data alternates between 2-repeat frames and 3-repeat frames.

The timing controller 38 may determine whether a received image frame is a 2-repeat frame or a 3-repeat frame based at least in part on duration the display image data instructs the electronic display 12 to display the image frame (decision block 76). For example, the timing controller 38 may determine that the image frame is a 2-repeat frame when the display image data instructs the electronic display 12 to display the image frame for a duration equivalent to two 60 Hz image frames. On the other hand, the timing controller 38 may determine that the image frame is a 3-repeat frame when the display image data instruct the electronic display 12 to display the image frame for a duration equivalent to three 60 Hz.

When a 2-repeat frame is detected, the timing controller 38 may instruct the display driver 40 to write the image frame to the electronic display using a 30 Hz refresh rate (process block 82). On the other hand, when a 3-repeat frame is detected, the timing controller 38 may instruct the display driver 40 to write the image frame to the electronic display 12 using a 30 Hz refresh rate (process block 78) and subsequently instruct the display driver 40 to write the image frame to the electronic display 12 using a 60 Hz refresh rate (process block 80).

In other embodiments, when a 3-repeat frame is detected, the timing controller 38 may instruct the display driver 40 to write the image frame to the electronic display using a 60 Hz refresh rate and subsequently instruct the display driver 40 to repeat the image frame using a 30 Hz refresh rate. In fact, in some embodiments, the order of the 30 Hz image frame and the 60 Hz image frame may be determined to reduce polarization of pixels in the electronic display 12.

More specifically, as discussed above, each image frame is generally written by applying voltages to pixels in the electronic display 12. In some embodiments, the polarity of the voltages applied to the pixels may alternate between positive polarity voltages and negative polarity voltages. However, since the duration each image frame is displayed may vary based on refresh rate, the duration positive polarity voltages and the duration negative polarity voltages are applied to the pixels may differ, thereby polarizing the pixels (e.g., inversion imbalance). For example, when a 30 Hz image frame is written with a negative polarity voltage and 60 Hz image frame is written with a positive polarity, the pixels may be polarized negative because the negative polarity voltage is applied for a longer duration.

Accordingly, in some embodiments, when each successive image frame is written with alternating voltage polarities, the 30 Hz image frame may be displayed with voltage polarities opposite polarization of the pixels while the 60 Hz image frame may be displayed with voltage polarities the same as polarization of the pixels. For example, when the pixels are polarized negative and the next image frame is to be written with a negative polarity voltage, the next image frame may be displayed at 60 Hz. The next image frame may then be repeated at 30 Hz by applying a positive polarity voltage, thereby reducing polarization of the pixels.

Using the described techniques, the power consumption of the electronic display may be reduced because a lower refresh rate is used to display the image frame. More specifically, the power consumption may be reduced because the timing controller 38 instructs the display driver 40 to write the one 30 Hz image frame instead of two 60 Hz image frames. Moreover, perceived image quality may be maintained because the duration the image frame is perceived is substantially unchanged. For example, when a 2-repeat frame, the image frame may still be perceived by a user for approximately 33.3 milliseconds and, when a 3-repeat frame, the image frame may still be perceived by the user for approximately 50 milliseconds.

Figure 9:
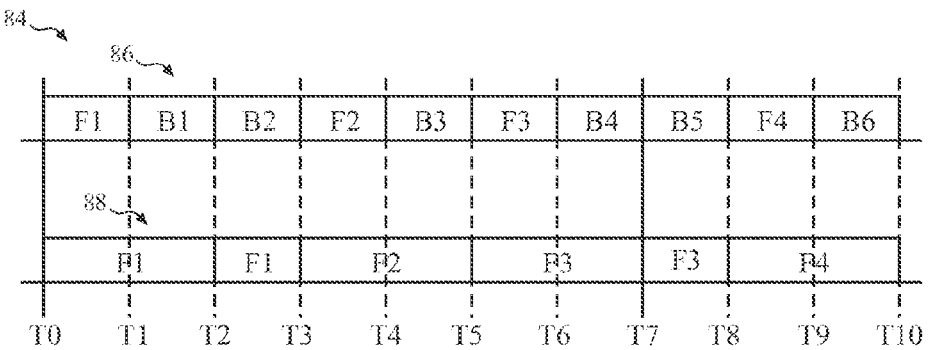
FIG. 9 is an example of a first hypothetical operation of an electronic display when display image data has a 3:2 cadence, in accordance with an embodiment.

Accordingly, the timing controller 38 may determine refresh rate with which to display image frames received from the image source 36 based on whether the image frame is a 2-repeat frame or a 3-repeat frame. To help illustrate, a first hypothetical display operation 84 when display image data has a 3:2 cadence is described in FIG. 9. More specifically, the first hypothetical display operation 84 includes a source frame stream 86, which describes image frames (e.g., display image data) transmitted by the image source 36, and a timing controller frame stream 88, which describes image frames displayed on the electronic display, between t0 and t10.

In the depicted embodiment, at t0, the image source 36 transmits a first image frame F1 to the electronic display 12 from via the source frame stream 86. After transmitting the first image frame F1, the image source 36 transmits a first blank frame B1 at t1 and a second blank frame B2 at t2 via the source frame stream 86. As discussed above, the two blank frames may instruct the electronic display that the desired duration to display the first image frame F1 is equivalent to three 60 Hz image frames.

As such, the timing controller 38 may determine that the first image frame F1 is a 3-repeat frame, the display image data has a 3:2 cadence, and the capture rate of video content described by the display image data may be 24 Hz. As described by the timing controller frame stream 88, since the first image frame F1 is a 3-repeat frame, the timing controller 38 may instruct the electronic display 12 to display the first image frame F1 with a 30 Hz refresh rate between t0 and t2 and to display the first image frame F1 with a 60 Hz refresh rate between t2 and t3.

At t3, the image source 36 transmits a second image frame F2 to the electronic display 12 via the source frame stream 86. After transmitting the second image frame F2, the image source 36 transmits a third blank frame B3 at t4 via the source frame stream 86. As discussed above, the blank frame may instruct the electronic display that the desired duration to display the second image frame F2 is equivalent to two 60 Hz image frames.

As such, the timing controller 38 may determine that the second image frame F2 is a 2-repeat frame. As described by the timing controller frame stream 88, since the second image frame F2 is a 2-repeat frame, the timing controller 38 may instruct the electronic display 12 to display the second image frame F2 with a 30 Hz refresh rate between t3 and t5.

At t5, the image source 36 transmits a third image frame F3 to the electronic display 12 from via the source frame stream 86. After transmitting the third image frame F3, the image source 36 transmits a fourth blank frame B4 at t6 and a fifth blank frame B5 at t7 via the source frame stream 86.

As discussed above, the two blank frames may instruct the electronic display that the desired duration to display the third image frame F3 is equivalent to three 60 Hz image frames.

As such, the timing controller 38 may determine that the third image frame F3 is a 3-repeat frame. As described by the timing controller frame stream 88, since the third image frame F3 is a 3-repeat frame, the timing controller 38 may instruct the electronic display 12 to display the third image frame F3 with a 30 Hz refresh rate between t5 and t7 and to display the third image frame F3 with a 60 Hz refresh rate between t7 and t8.

At t8, the image source 36 transmits a fourth image frame F4 to the electronic display 12 via the source frame stream 86. After transmitting the fourth image frame F4, the image source 36 transmits a sixth blank frame B6 at t9 via the source frame stream 86. As discussed above, the blank frame may instruct the electronic display that the desired duration to display the fourth image frame F4 is equivalent to two 60 Hz image frames.

As such, the timing controller 38 may determine that the fourth image frame F4 is a 2-repeat frame. As described by the timing controller frame stream 88, since the fourth image frame F4 is a 2-repeat frame, the timing controller 38 may instruct the electronic display 12 to display the fourth image frame F4 with a 30 Hz refresh rate between t8 and t10.

Figure 10:
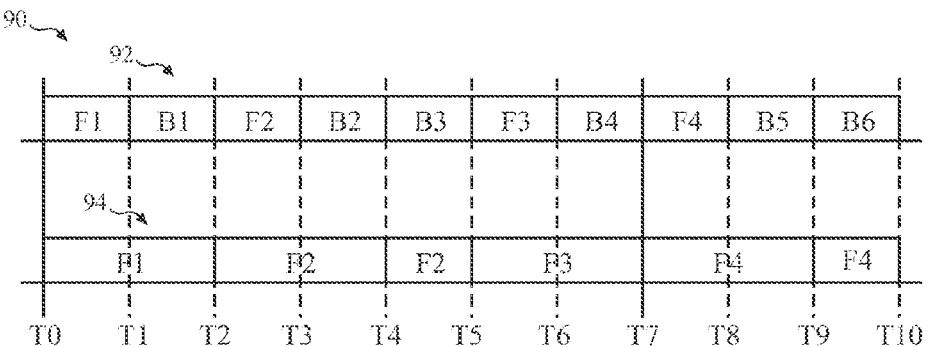
FIG. 10 is an example of a second hypothetical operation of an electronic display when display image has a 2:3 cadence, in accordance with an embodiment.

To further illustrate, a second hypothetical display operation 90 when display image data has a 2:3 cadence is described in FIG. 10. More specifically, the second hypothetical display operation 90 includes a source frame stream 92, which describes image frames (e.g., display image data) transmitted by the image source 36, and a timing controller frame stream 94, which describes image frames displayed on the electronic display 12, between t0 and t10.

In the depicted embodiment, at t0, the image source 36 transmits a first image frame F1 to the electronic display 12 via the source frame stream 92. After transmitting the first image frame F1, the image source 36 transmits a first blank frame B1 at t1 via the source frame stream 92. As discussed above, the blank frame may instruct the electronic display that the desired duration to display the first image frame F1 is equivalent to two 60 Hz image frames.

As such, the timing controller 38 may determine that the second image frame F2 is a 2-repeat frame, the display image data has a 2:3 cadence, and the capture rate of video content described by the display image data may be 24 Hz. As described by the timing controller frame stream 94, since the first image frame F1 is a 2-repeat frame, the timing controller 38 may instruct the electronic display 12 to display the first image frame F1 with a 30 Hz refresh rate between t0 and t2.

At t2, the image source 36 transmits a second image frame F2 to the electronic display 12 from via the source frame stream 92. After transmitting the second image frame F2, the image source 36 transmits a second blank frame B2 at t3 and a third blank frame B3 at t4 via the source frame stream 92. As discussed above, the two blank frames may instruct the electronic display that the desired duration to display the second image frame F2 is equivalent to three 60 Hz image frames.

As such, the timing controller 38 may determine that the second image frame F2 is a 3-repeat frame. As described by the timing controller frame stream 94, since the second image frame F2 is a 3-repeat frame, the timing controller 38 may instruct the electronic display 12 to display the second image frame F2 with a 30 Hz refresh rate between t2 and t4 and to display the second image frame F2 with a 60 Hz refresh rate between t4 and t5.

At t5, the image source 36 transmits a third image frame F3 to the electronic display 12 via the source frame stream 92. After transmitting the third image frame F3, the image source 36 transmits a fourth blank frame B4 at t6 via the source frame stream 92. As discussed above, the blank frame may instruct the electronic display that the desired duration to display the third image frame F3 is equivalent to two 60 Hz image frames.

As such, the timing controller 38 may determine that the third image frame F3 is a 2-repeat frame. As described by the timing controller frame stream 94, since the third image frame F3 is a 2-repeat frame, the timing controller 38 may instruct the electronic display 12 to display the third image frame F3 with a 30 Hz refresh rate between t5 and t7.

At t7, the image source 36 transmits a fourth image frame F4 to the electronic display 12 from via the source frame stream 92. After transmitting the fourth image frame F4, the image source 36 transmits a fifth blank frame B5 at t8 and a sixth blank frame B6 at t9 via the source frame stream 92. As discussed above, the two blank frames may instruct the electronic display that the desired duration to display the fourth image frame F4 is equivalent to three 60 Hz image frames.

As such, the timing controller 38 may determine that the fourth image frame F4 is a 3-repeat frame. As described by the timing controller frame stream 94, since the fourth image frame F4 is a 3-repeat frame, the timing controller 38 may instruct the electronic display 12 to display the fourth image frame F4 with a 30 Hz refresh rate between t7 and t9 and to display the fourth image frame F4 with a 60 Hz refresh rate between t9 and t10.

Thus, as described by the first hypothetical operation 84 and the second hypothetical display operation 90, the electronic display 12 may use a 30 Hz refresh rate for 80% of operation when displaying video content. In fact, since a 30 Hz image frame may consume 40% less power than two 60 Hz image frames, the overall power consumption of the electronic display 12 may be reduced 32%. Moreover, perceived image quality of the electronic display 12 may be maintained because duration each image frame is perceived is not substantially changed.

Accordingly, the technical effects of the present disclosure include improving operation of an electronic display, particularly when displaying video content, by reducing power consumption of electronic displays while maintaining perceived image quality. In some embodiments, power consumption may be reduced by using reduced refresh rates (e.g., 30 Hz). More specifically, the electronic display may determine when to use reduced refresh rates based at least in part on the on capture rate of the video content. Additionally, the electronic display may determine when to use reduced refresh rates such that perceivable duration of each image frame is not substantially changed, thereby maintaining perceived image quality.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic display comprising:
a display driver electrically coupled to pixels of the electronic display, wherein the display driver is configured to write image frames to the pixels with one of a first refresh rate and a second refresh rate, wherein the first refresh rate is less than the second refresh rate; and
a timing controller configured to:
receive a plurality of image frames from an image source, wherein the plurality of image frames are configured to be displayed on the electronic display to play video content;
detect a cadence with which the plurality of image frames is received from the image source; and
based at least in part on the cadence of the plurality of image frames, instruct the display driver to write each of the plurality of image frames either as:
a single image frame at the first refresh rate; or
an image frame at the first refresh rate followed by a repeat of the image frame at the second refresh rate.

2. The electronic display of claim 1, wherein the timing controller is configured to:
detect a 2:3 cadence when the plurality of image frames comprises a first image frame followed by a first blank image frame followed by a second image frame; and
detect a 3:2 cadence when the plurality of image frames comprises the first image frame followed by the first blank image frame followed by a second blank image frame.

3. The electronic display of claim 2, wherein the timing controller is configured to:
instruct the display driver to write the first image frame at the first refresh rate when the 2:3 cadence is detected; and
instruct the display driver to write the first image frame at the first refresh rate followed by a repeat of the first image frame at the second refresh rate when the 3:2 cadence is detected.

4. The electronic display of claim 1, wherein the timing controller is configured to determine that a capture rate of the video content is 24 Hz when the cadence of the plurality of image frames is a 2:3 cadence or a 3:2 cadence.

5. The electronic display of claim 1, wherein the first refresh rate is 30 Hz, the second refresh rate is 60 Hz, and a capture rate of the video content is 24 Hz.

6. The electronic display of claim 1, wherein the timing controller is configured to:
determine whether an image frame received from the image source communicatively coupled to the electronic display is a 2-repeat frame, wherein the image frame is to be displayed by the electronic display to play the video content;
instruct the electronic display to display the image frame at the first refresh rate when the image frame is a 2-repeat frame;
determine whether the image frame is a 3-repeat frame; and
instruct the electronic display to display the image frame at the first refresh rate followed by a repeat of the image frame at the second refresh rate when the image frame is a 3-repeat frame, wherein the first refresh rate is half the second refresh rate.

7. The electronic display of claim 1, wherein the timing controller is configured to:
determine that the electronic display supports a 30 Hz refresh rate and a 60 Hz refresh rate;
determine that the video content corresponding with display image data received from the image source has a capture rate of 24 Hz;
instruct the electronic display to display a first image frame based at least in part on the display image data as a 30 Hz image frame and a 60 Hz image frame; and
instructing, using the timing controller, the electronic display to display a second image frame based at least in part on the display image data as a single 30 Hz image frame.

8. A tangible, non-transitory, computer-readable medium storing instructions executable by a processor of an electronic display, wherein the instructions comprise instructions to:
determine, using the processor, whether an image frame received from an image source communicatively coupled to the electronic display is a 2-repeat frame, wherein the image frame is to be displayed by the electronic display to play video content;
instruct, using the processor, the electronic display to display the image frame at a first refresh rate when the image frame is a 2-repeat frame;
determine, using the processor, whether the image frame is a 3-repeat frame; and
instruct, using the processor, the electronic display to display the image frame at the first refresh rate followed by a repeat of the image frame at a second refresh rate when the image frame is a 3-repeat frame, wherein the first refresh rate is half the second refresh rate.

9. The computer-readable medium of claim 8, wherein the instructions to determine whether the image frame is a 2-repeat frame comprise instructions to determine that the image frame is a 2-repeat frame when the image frame is followed by one blank image frame and another image frame that is not a blank image frame.

10. The computer-readable medium of claim 8, wherein the instructions to determine whether the image frame is a 3-repeat frame comprise instructions to determine that the image frame is a 3-repeat frame when the image frame is followed by a first blank image frame and a second blank image frame.

11. The computer-readable medium of claim 8, comprising instructions to determine that capture rate of the video content is 24 Hz when the image frame is a 2-repeat frame or when the image frame is a 3-repeat frame.

12. The computer-readable medium of claim 8, wherein the instructions to display the image frame at the first refresh rate followed by the repeat of the image frame at the second refresh rate comprise instructions to display the image frame at 30 Hz followed by the repeat of the image frame at 60 Hz.

13. The computer-readable medium of claim 8, wherein the instructions to display the image frame at the first refresh rate comprise instructions to display the image frame at 30 Hz.

14. A method comprising:
determining, using a timing controller of an electronic display, that the electronic display supports a 30 Hz refresh rate and a 60 Hz refresh rate;
determining, using the timing controller, that video content corresponding with display image data received from an image source has a capture rate of 24 Hz;
instructing, using the timing controller, the electronic display to display a first image frame based at least in part on the display image data as a 30 Hz image frame and a 60 Hz image frame; and instructing, using the timing controller, the electronic display to display a second image frame based at least in part on the display image data as a single 30 Hz image frame.

15. The method of claim 14, wherein instructing the electronic display to display the first image frame comprises instructing the electronic display to display the first image frame a duration equivalent to three 60 Hz image frames.

16. The method of claim 14, wherein instructing the electronic display to display the second image frame comprises instructing the electronic display to display the second image frame a duration equivalent to two 60 Hz image frames.

17. The method of claim 14, wherein determining the capture rate of the video content comprises receiving the capture rate from the image source.

18. The method of claim 14, wherein determining the capture rate of the video content comprises:
    determining a cadence with which the display image data is received from the image source; and
    determining that the capture rate of the video content is 24 Hz when the display image data is received with a 2:3 cadence or a 3:2 cadence.

19. The method of claim 14, comprising determining, using the timing controller, polarization of pixels in the electronic display;
    wherein instructing the electronic display to display the first image frame comprises instructing the electronic display to successively display the first image frame at a first refresh rate by applying a first set of voltage polarities to the pixels and the first image frame at a second refresh rate by applying a second set of voltage polarities, wherein:
        the first refresh rate is 30 Hz and the second refresh rate is 60 Hz when polarity of the polarization of the pixels is opposite polarity of the first set of voltage polarities; and
        the first refresh rate is 60 Hz and the second refresh rate is 30 Hz when polarity of the polarization of the pixels is same as polarity of the first set of voltage polarities.

20. A computing device comprising:
    an image source configured to output display image data corresponding to video content; and
    an electronic display communicatively coupled to the image source, wherein the electronic display is configured to:
        receive the display image data from the image source; and
        play the video content by successively displaying a first image frame and a second image frame based at least in part on the display image data, wherein:
            the first image frame is displayed a duration one and a half times longer than the second image frame;
            the first image frame is displayed at a first refresh rate followed by a repeat of the first image frame at a second refresh rate, wherein the first refresh rate is half the second refresh rate; and
            the second image frame is displayed at the first refresh rate.

21. The computing device of claim 20, wherein, to play the video content, the electronic display is configured to successively display a third image frame immediately after the second image frame and a fourth image frame immediately after the third image frame, wherein:
    the third image frame is displayed a duration equivalent to the first image frame;
    the fourth image frame is displayed a duration equivalent to the second image frame;
    the third image frame is displayed at the first refresh rate followed by a repeat of the third image frame at the second refresh rate; and
    the fourth image frame is displayed at the first refresh rate.

22. The computing device of claim 20, wherein the display image data comprises:
    the first image frame followed by two blank image frames; and
    the second image frame followed by a single blank image frame.

23. The computing device of claim 20, wherein, to play the video content, the electronic display is configured to:
    display the first image frame a first duration equivalent to three 60 Hz image frames; and
    display the second image frame a second duration equivalent to two 60 Hz image frames.

24. The computing device of claim 20, wherein the first refresh rate is 30 Hz and the second refresh rate is 60 Hz.

25. The computing device of claim 20, wherein the computing device comprises a portable phone, a media player, a personal data organizer, a handheld game platform, a tablet device, a computer, or any combination thereof.

26. A tangible, non-transitory, computer readable medium storing instructions executable by a processor of an electronic display, wherein the instructions comprise instructions to:
    detect, using the processor, that a first image frame received from an image source that instructs the electronic display to display the first image frame;
    detect, using the processor, whether a second image frame received directly after the first image frame instructs the electronic display to display the second image frame;
    detect using the processor, whether a third image frame received directly after the second image frame instructs the electronic display to display the third image frame;
    determine, using the processor, that the first image frame is a 3-repeat frame when the second image frame does not instruct the electronic display to display the second image frame and the third image frame does not instruct the electronic display to display the third image frame; and
    instruct, using the processor, the electronic display to display the first image frame a duration equivalent to total duration the first image frame, the second image frame, and the third image frame are received from the image source by displaying the first image frame using a first refresh rate and a second refresh rate.

27. The computer readable medium of claim 26, comprising instructions to:
    determine, using the processor, that the first image frame is a 2-repeat frame when the second image frame does not instruct the electronic display to display the second image frame and the third image frame instructs the electronic display to display the third image frame; and
    instruct, using the processor, the electronic display to display the first image frame a duration equivalent to total duration the first image frame and the second image frame are received from the image source by displaying the first image frame using the first refresh rate.

28. The computer readable medium of claim 26, comprising instructions to:
    determine, using the processor, polarization of pixels in the electronic display;

instruct, using the processor, the electronic display to successively display the first image frame at the first refresh rate by applying a first set of voltage polarities to the pixels and the first image frame at the second refresh rate by applying a second set of voltage polarities, wherein:

the first refresh rate is lower than the second refresh rate when polarity of the polarization of the pixels is opposite polarity of the first set of voltage polarities; and the first refresh rate is greater than the second refresh rate when polarity of polarization of the pixels is same as polarity of the first set of voltage polarities.

* * * * *